United States Patent
Böck et al.

(10) Patent No.: US 10,611,339 B2
(45) Date of Patent: Apr. 7, 2020

(54) DEVICE AND METHOD FOR OPERATING A VEHICLE ACCESS AND/OR DRIVING AUTHORIZATION SYSTEM

(71) Applicant: DAIMLER AG, Stuttgart (DE)

(72) Inventors: Simon Böck, Stuttgart (DE); Joern-Marten Ohle, Renningen-Malmsheim (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 16/317,605

(22) PCT Filed: Jul. 3, 2017

(86) PCT No.: PCT/EP2017/000785
§ 371 (c)(1),
(2) Date: Jan. 14, 2019

(87) PCT Pub. No.: WO2018/010832
PCT Pub. Date: Jan. 18, 2018

(65) Prior Publication Data
US 2019/0315312 A1 Oct. 17, 2019

(30) Foreign Application Priority Data

Jul. 15, 2016 (DE) .......................... 10 2016 008 624

(51) Int. Cl.
*B60R 25/24* (2013.01)
*B60R 25/102* (2013.01)

(52) U.S. Cl.
CPC ............ *B60R 25/24* (2013.01); *B60R 25/102* (2013.01); *B60R 2325/205* (2013.01)

(58) Field of Classification Search
CPC .................. B60R 25/24; B60R 25/102; B60R 2325/2059

(Continued)

(56) References Cited

U.S. PATENT DOCUMENTS

| 9,162,648 | B1 | 10/2015 | Weng et al. | |
|---|---|---|---|---|
| 2003/0189482 | A1* | 10/2003 | Arshad | .................. B60R 25/04 340/5.61 |

(Continued)

FOREIGN PATENT DOCUMENTS

| CN | 103689875 A | 4/2014 |
|---|---|---|
| DE | 102012009019 A1 | 11/2013 |

(Continued)

OTHER PUBLICATIONS

International Search Report dated Oct. 13, 2017 in related International Application No. PCT/EP2017/000785.

(Continued)

*Primary Examiner* — Ojiako K Nwugo
(74) *Attorney, Agent, or Firm* — Patent Portfolio Builders PLLC

(57) ABSTRACT

A device for operating an access and/or driving authorization system of a vehicle includes a mobile access and/or driving authorization unit, a control unit arranged in the vehicle, and at least one detection unit which can be coupled to at least one electronic communication unit. The at least one electronic communication unit is arranged integrated into a document. The at least one detection unit is arranged integrated in the mobile access and/or driving authorization unit and/or in the vehicle. A presence checking operation of the document can be carried out automatically by the at least one detection unit for a person who is in possession of the mobile access and/or driving authorization unit at a specific time. An output unit outputs a message to the person at the specific time as a function of a result of the presence checking operation.

7 Claims, 1 Drawing Sheet

(58) Field of Classification Search
USPC .......................................................... 340/5.61
See application file for complete search history.

(56) References Cited

U.S. PATENT DOCUMENTS

| | | | |
|---|---|---|---|
| 2003/0222758 A1* | 12/2003 | Willats | B60R 25/04 340/5.72 |
| 2010/0188226 A1 | 7/2010 | Seder et al. | |
| 2010/0259389 A1* | 10/2010 | Marshall | G08B 21/24 340/572.1 |
| 2012/0235787 A1* | 9/2012 | Brient | H04M 1/7253 340/5.61 |
| 2012/0286928 A1* | 11/2012 | Mullen | G06Q 10/00 340/5.61 |
| 2014/0057609 A1 | 2/2014 | Vaananen | |
| 2016/0300054 A1* | 10/2016 | Turgeman | H04L 63/08 |

FOREIGN PATENT DOCUMENTS

| | | |
|---|---|---|
| DE | 102016100065 A1 | 7/2017 |
| EP | 2871622 A1 | 5/2015 |

OTHER PUBLICATIONS

Written Opinion dated Oct. 13, 2017 in related International Application No. PCT/EP2017/000785.

* cited by examiner

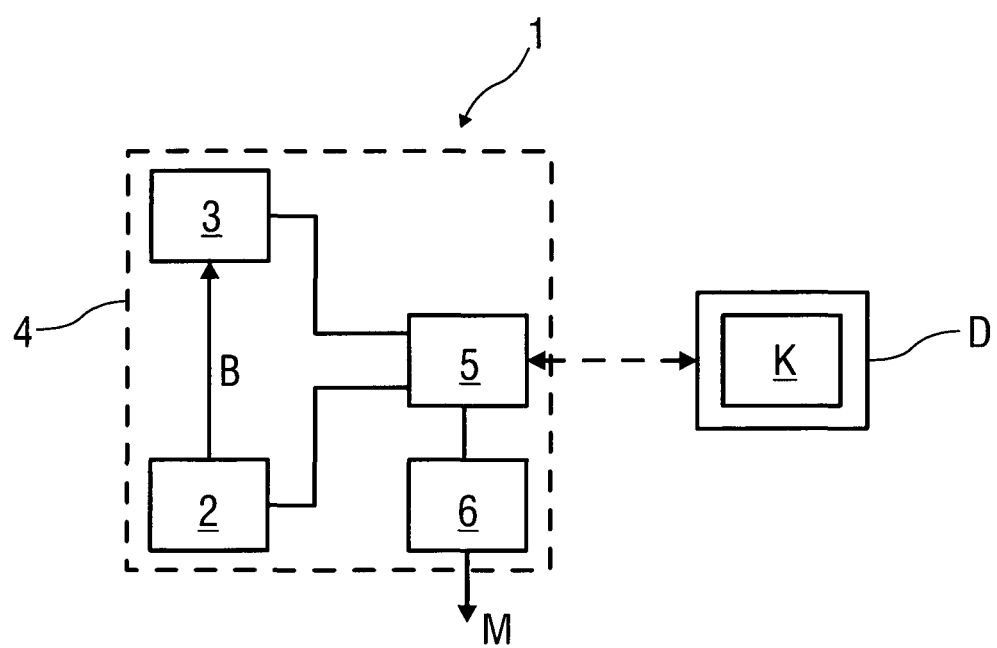

DEVICE AND METHOD FOR OPERATING A VEHICLE ACCESS AND/OR DRIVING AUTHORIZATION SYSTEM

BACKGROUND AND SUMMARY OF THE INVENTION

Exemplary embodiments of the invention relate to a device and method for operating an access and/or driving authorization system.

Devices and methods for operating an access and/or driving authorization system are known in the art. For example, DE 10 2012 009 019 A1 describes a method for operating a vehicle, in which a detection means of the vehicle automatically detects data relating to driving authorization in general for driving motor vehicles. This data is automatically checked and a function of the vehicle is activated if the data check had a positive result.

Exemplary embodiments of the invention are directed to an improved a device and method for operating an access and/or driving authorization system.

A device according to the invention for operating an access and/or driving authorization system for a vehicle comprises a mobile access and/or driving authorization unit, a control unit arranged in the vehicle and at least one detection unit, which can be coupled to at least one electronic communication unit, wherein the at least one electronic communication unit is integrated in a document. The at least one detection unit is integrated in the mobile access and/or driving authorization unit and/or is arranged in the vehicle in this case, wherein, by means of the detection unit a check can be automatically carried out to check that a person who is in possession of the mobile access and/or driving authorization unit has the document with them at a specific point in time, and wherein an output unit is provided for issuing a message to the person at the specific point in time on the basis of a result of the presence check.

The device can be used to check whether the person is carrying important documents with them, such as an official driving authorization, before starting their journey. If not, the person is automatically alerted and can fetch the missing documents. Since these days several official documents such as the ID card or driving authorization, are already the size of a bank card having an integrated electronic communication unit, for example an RFID transponder (RFID=radiofrequency identification), it is easy to check if such a document is present. In addition, this increases the level of comfort for the person by saving time and possibly costs, since the person is reminded of missing documents in due time.

BRIEF DESCRIPTION OF THE DRAWING FIGURE

Embodiments of the invention are explained in more detail in the following on the basis of a drawing, in which:

FIG. 1 is a schematic view of an access and/or driving authorization system for a vehicle.

DETAILED DESCRIPTION

They only FIGURE, FIG. 1, shows a block diagram for an access and/or driving authorization system 1 for a vehicle (not shown in more detail).

The access and/or driving authorization system 1 for the vehicle comprises a mobile access and/or driving authorization unit 2 for transmitting authorization data B to the vehicle, which is used to grant access and/or driving authorization. The access and/or driving authorization unit 2 comprises, for example, a control unit and a transceiver, which are arranged in a common housing, so that the access and/or driving authorization unit 2 has a modular construction. In this case, the control unit comprises an electronic system for the access and/or driving authorization system 1 of the vehicle, in which an authorization code is stored. The transmitter and/or receiver comprises a plurality of antenna, which are designed and oriented such that signals can be optimally received from the vehicle and/or optimally transmitted to the vehicle.

Furthermore, the access and/or driving authorization system 1 comprises a control unit 3 in the vehicle, which receives and checks the authorization data B sent by the access and/or driving authorization unit 2, i.e., access to the vehicle and/or driving authorization for the vehicle is enabled by the transmission of a radio signal between the access and/or driving authorization unit 2 and the control unit 3. If the result of the check is positive, the control unit 3 grants the access authorization and/or driving authorization for the vehicle. The control unit 3 can comprise one or more control devices and/or other electronic units, for example a microcontroller.

Furthermore, the access and/or driving authorization system 1 comprises a device 4 for operating the access and/or driving authorization system 1. In this case, the device 4 comprises the access and/or driving authorization unit 2, the control unit 3 and at least one detection unit 5, which is provided for checking that a person who is in possession of the mobile vehicle access and/or driving authorization unit 2 at a specific point in time has a document D with them. The specific point in time is, for example, when the person is on the way to the vehicle. Therefore, the point in time is preferably before the journey begins.

In this case, the document D is, in particular, a document in the size of a bank card, for example an ID card or official driving authorization, which is provided with an electronic communication unit K, by means of which the document D comprises an electronic authentication function, i.e., the document D is provided with an electronic information carrier, for example an RFID transponder (RFID=radiofrequency identification), which is, for example, an antenna, an analogue circuit for receiving and sending signals and a digital circuit and a data store that can be written at least once. The information carrier forms the electronic communication unit K. In order to detect that the person who is in possession of the access and/or driving authorization unit 2 has such a document D with them, the at least one detection 5 is expediently integrated in the access and/or driving authorization unit 2. Alternatively or additionally, another detection unit (not shown) may be integrated in the control unit 3.

The at least one detection unit 5 is formed as an RFID reader, for example, which generates a high-frequency AC electromagnetic field to which the RFID transponder in the document D is exposed. In this case, the RFID transponder is activated and transmits a coded response, for example by means of load modulation or by means of modulated backscatter. Unlike the RFID, the at least one detection unit 5 and the electronic communication unit K of the document D can also communicate by means of near-field communication (NFC) or Bluetooth.

A conclusion can be drawn as to whether the person has the document D with them on the basis of a signal sent by the electronic communication unit K of the document D, in this case the RFID transponder, for example. For this purpose, the at least one detection unit 5 is coupled to a data processing unit (not shown), for example, which evaluates data transmitted by the detection unit 5. Such a data processing unit is, for example, also arranged in the access and/or driving authorization unit 2.

The at least one detection unit 5 expediently only detects the presence or absence of the document D at specific points in time, wherein the points in time can preferably be set by the person. Points in time before the journey commences are particularly advantageous in this case, for example when the person leaves their house or dwelling. The person is alerted by an output unit 6, which issues a message M to the person acoustically and/or visually and/or haptically if it establishes that the document D is absent at the set point in time.

In this case, the evaluation unit 6 can be arranged in the access and/or driving authorization unit 2 and may comprise a display and/or a loudspeaker, for example. Alternatively, the output unit 6 is formed as a mobile phone, advantageously as a so-called Smartphone, and can be coupled to the access and/or driving authorization unit 2, in particular to the at least one detection unit 5. It is also conceivable for the output unit 6 to be a component of an instrument cluster arranged in the vehicle. In this case, the at least one detection unit 5 can also be arranged in the vehicle. The person is then alerted of the absence of the document D when they get in the vehicle or when they start the vehicle.

Finally, the use of the device 4 will be summarized in the following.

People often travel to important official visits by car. When leaving the house, the person may forget documents D required for the visit. Nowadays, important documents D in the size of a bank card are already provided with standard data interfaces, such as NFC, RFID or Bluetooth, and therefore comprise an electronic communication unit K. These standard interfaces can be used to communicate with the vehicle key, in this case the access and/or driving authorization unit 2, and/or with the vehicle. If the document D does not comprise such an interface, this can be formed by an attachment, which is attached to the document D. The attachment comprises one of the above-mentioned interfaces and is therefore able to communicate with the vehicle key and/or the vehicle by means of the standard data interfaces. For example, when a person leaves their house and/or their vehicle itself, the vehicle key, in particular the at least one detection unit 5, checks that they have the required document D with them. If the absence of the document D is detected, the person is alerted thereof. This can be done by means of a voice message or text message, for example, which is output on a mobile phone.

In this case, important documents D can be an ID card, a credit card, driving authorization, a passport or any other important document D or components that are required for holidays and/or journeys to an airport and/or for an attendance check for a workplace ID card, for example. Furthermore, the device 4 can also be extended to checking the presence of components such as mobile phones, watches or other devices or objects that the person needs. The above-described attachment, for example, can be used for this purpose.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A device for operating an access and/or driving authorization system for a vehicle, the device comprising:
    a mobile access and/or driving authorization unit, wherein the mobile access and/or driving authorization unit is a key for the vehicle;
    a control unit arranged in the vehicle, and
    at least one detection unit integrated in the mobile access and/or driving authorization unit and coupleable to at least one electronic communication unit, wherein the at least one electronic communication unit is integrated in a document, wherein
    the at least one detection unit is configured to automatically check that a person who is in possession of the mobile access and/or driving authorization unit has the document with them at a specific point in time, and
    an output unit is configured to issue a message to the person at the specific point in time based on the automatic check,
    the control unit is configured to receive and check authorization data sent by the access and/or driving authorization unit, and
    the control unit is configured to grant access authorization and/or driving authorization for the vehicle if a result of the automatic check is that the person has the document with them at the specific point in time.

2. The device of claim 1, wherein the output unit is arranged in a mobile electronic terminal, which is coupleable to the at least one detection unit.

3. The device of claim 1, wherein the output unit is a component of an instrument cluster arranged in the vehicle.

4. The device of claim 1, wherein the document is an ID card, credit card, driving authorization, or passport.

5. A method for operating an access and/or driving authorization system for a vehicle, the method comprising:
    automatically checking, by at least one detection unit, that a person in possession of a mobile access and/or driving authorization unit has a document with them at a specific point in time using a coupling between the at least one detection unit and at least one electronic communication unit integrated in the document, wherein the at least one detection unit is integrated in the mobile access and/or driving authorization unit and the mobile access and/or driving authorization unit is a key for the vehicle;
    outputting a message to the person at the specific point in time based on the automatic check;
    receiving and checking, by a control unit, authorization data sent by the access and/or driving authorization unit; and
    granting, by the control unit, access authorization and/or driving authorization for the vehicle responsive to the automatic check indicating that the person has the document with them at the specific point in time.

6. The method of claim 5, wherein it is detected that the person does not have the document on them at the specific point in time responsive to the at least one detection unit not receiving a response signal from the at least one electronic communication unit after issuing a signal.

7. The method of claim 5, wherein the document is an ID card, credit card, driving authorization, or passport.

* * * * *